United States Patent
Sharma et al.

(10) Patent No.: US 11,770,748 B2
(45) Date of Patent: *Sep. 26, 2023

(54) INTERCONNECTIONS BETWEEN THE CORE NETWORKS

(71) Applicants: Sony Group Corporation, Tokyo (JP); Sony Mobile Communications Inc., Tokyo (JP)

(72) Inventors: Vivek Sharma, Basingstoke (GB); Svante Alnås, Lund (SE); Lars Nord, Lund (SE); Hideji Wakabayashi, Basingstoke (GB); Anders Berggren, Lund (SE); Yuxin Wei, Basingstoke (GB)

(73) Assignees: SONY GROUP CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,937

(22) Filed: Oct. 13, 2022

(65) Prior Publication Data

US 2023/0044137 A1 Feb. 9, 2023

Related U.S. Application Data

(63) Continuation of application No. 16/969,978, filed as application No. PCT/EP2019/053333 on Feb. 11, 2019, now Pat. No. 11,503,519.

(30) Foreign Application Priority Data

Feb. 15, 2018 (EP) ..................................... 18157035

(51) Int. Cl.
*H04W 4/00* (2018.01)
*H04W 36/08* (2009.01)
(Continued)

(52) U.S. Cl.
CPC ........... *H04W 36/08* (2013.01); *H04W 48/10* (2013.01); *H04W 76/10* (2018.02)

(58) Field of Classification Search
CPC ...... H04W 36/08; H04W 76/10; H04W 48/10
See application file for complete search history.

(56) References Cited

U.S. PATENT DOCUMENTS

| | | | | |
|---|---|---|---|---|
| 11,503,519 B2* | 11/2022 | Sharma | ................. | H04W 36/08 |
| 2014/0086177 A1* | 3/2014 | Adjakple | ............... | H04W 74/04 370/329 |
| 2017/0064601 A1* | 3/2017 | Kubota | ............... | H04W 36/165 |

FOREIGN PATENT DOCUMENTS

WO 2018/202539 A1 11/2018

OTHER PUBLICATIONS

International Search Report and Written Opinion dated May 17, 2019 for PCT/EP2019/053333 filed on Feb. 11, 2019, 9 pages.

(Continued)

*Primary Examiner* — Justin Y Lee
(74) *Attorney, Agent, or Firm* — XSENSUS LLP

(57) ABSTRACT

Embodiments of the present technique can provide a mobile device and a method of establishing a connection via a core network by a mobile terminal. The method comprises receiving by the mobile terminal in a first cell an identifier assigned by a node in a first core network of a first type, the identifier comprising an identifier of the node or a group of nodes in the first core network, selecting a second cell in which service via a core network of a second type is available, and determining whether service via a core network of the first type is available from the second cell. The method further comprises establishing a connection via the second cell by transmitting a message including a first indication, the first indication based on at least a portion of the identifier, and when service via a core network of the first type is not available from the second cell, transmitting in the (Continued)

message a second indication, the second indication indicating that the identifier was received from a core network different from the second type, without identifying the first type of core network.

18 Claims, 6 Drawing Sheets

(51) Int. Cl.
 *H04W 76/10* (2018.01)
 *H04W 48/10* (2009.01)

(56) References Cited

OTHER PUBLICATIONS

3GPP, "5G; System Architecture for the 5G System," 3GPP TS 23.501 version 15.2.0 Release 15, ETSI TS 123 501 V15.2.0, Jun. 2018, pp. 1-218.

3GPP, "Digital cellular telecommunications system (Phase 2+); Universal Mobile Telecommunications System (UMTS); Numbering, addressing and identification," 3GPP TS 23.003 version 10.5.0 Release 10, ETSI TS 123 003 V10.5.0, Apr. 2012, pp. 1-82.

3GPP, "LTE; Evolved Universal Terrestrial Radio Access (E-UTRA) and Evolved Universal Terrestrial Radio Access Network (E-UTRAN); Overall description; Stage 2," 3GPP TS 36.300 version 14.2.0 Release 14, ETSI TS 136 300 V14.2.0, Apr. 2017, pp. 1-345.

3GPP, LTE; Evolved Universal Terrestrial Radio Access (E-UTRA); User Equipment (UE) procedures in idle mode, 3GPP TS 36.304 version 12.2.0 Release 12, ETSI 136 304 V12.2.0, Sep. 2014, pp. 1-38.

3GPP, "LTE; Evolved Universal Terrestrial Radio Access (E-UTRA); User Equipment (UE) radio access capabilities," 3GPP TS 36.306 version 14.2.0 Release 14, ETSI TS 136 306 V14.2.0, Apr. 2017, pp. 1-77.

3GPP, "Universal Mobile Telecommunications System (UMTS); LTE; Non-Access-Stratum (NAS) protocol for Evolved Packet System (EPS); Stage 3," 3GPP TS 24.301 version 10.3.0 Release 10, Jun. 2011, pp. 1-307.

Alcatel-Lucent, "Discussion document on explicit AS signalling for mapped PTMSI/GUTI," 3GPP TSG-RAN WG2 No. 72bis, R2-110290, Dublin, Ireland, Jan. 17-21, 2011, 7 pages.

Ericsson, "Handling of Collision between UE Identifiers in LTE connected to 5GC," 3GPP TSG-RAN WG2 No. 100, Tdoc R2-1713272, Reno, Nevada, USA, Nov. 27-Dec. 1, 2017, pp. 1-6.

* cited by examiner

INTERCONNECTIONS BETWEEN THE CORE NETWORKS

CROSS-REFERENCE TO RELATED APPLICATIONS

The present application is a continuation of U.S. application Ser. No. 16/969,978, filed Aug. 14, 2020, which is based on PCT filing PCT/EP2019/053333, filed Feb. 11, 2019, which claims priority to EP 18157035.9, filed Feb. 15, 2018, the entire contents of each are incorporated herein by reference.

BACKGROUND

Field

The present disclosure relates to wireless communications apparatus and methods for the transmission of an identifier generated by a core network entity to a radio access network entity by a mobile device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

As mobile telecommunications technology has developed, successive generations of technology have resulted in not only new radio techniques, which are typically implemented in a radio access network and at the lower layers of the protocol stack of a wireless communications device, but also in developments to so-called 'core network' functionality and the corresponding higher layer protocols. Nodes or entities within a radio access network typically provide geographically localised service to mobile devices within their respective localities. On the other hand, a single core network entity may serve many radio access network entities, providing services such as security (encryption), charging, and addressing.

In principle, functionality may be divided between the core network and a radio access network (and their respective protocols) in any appropriate manner; however, typically a core network will provide functionality that is independent of the location of the mobile device, although in order to minimize end-to-end latency, core network entities may preferably serve radio access network nodes which are geographically nearby. Moreover, a core network will typically provide the functionality by which connectivity external to the telecommunications network is obtained e.g. to the internet, or to the public switched telephone network (PSTN).

In operation, therefore, a given mobile device will obtain service via both a radio access network (for the management of radio connections) and a core network (e.g. for obtaining external connectivity).

In order to provide efficient use of core network resources, core network nodes may be grouped into pools; each pool serving a pre-configured group of radio access nodes, for example according to a load-balancing algorithm.

As described above, core network nodes generally perform functions which are not directly related to the exact location of a mobile device. In order to simplify implementation therefore, it is generally preferable that when a mobile device moves, such that its serving radio access node changes, its serving core network node does not change.

In order to identify mobile devices both for mobile-originated communications and for mobile-terminated communications while maintaining the privacy of the mobile device, either or both of the radio access network and the core network may assign temporary identifiers to the mobile terminal. These may differ in scope and as such be unique to varying degrees. For example, a core network may assign a globally unique identifier to a mobile terminal, while a radio access network may assign an identifier which is unique only within a limited geographic scope.

A core network node may include its own identity (or the identity of a group or 'pool' of core network nodes to which it belongs) in an identity which it assigns to a mobile device. When a mobile device connects to a new radio access node then, by providing the radio access node its core network identifier as part of a connection setup procedure, the radio access node is able to establish a connection to the same core network node or pool (i.e. the core network node from which the identity was obtained). This is preferable to the radio access node establishing a connection to an arbitrary core network node, since this may require the subsequent transfer of the core network context associated with the mobile device from the old to new core network nodes.

In [3], this challenge was addressed in the context of the use of core network identifiers issued by a 2G/3G core network, when establishing a connection in a long term evolution (LTE) network, and vice versa.

As described above, as different generations of radio access networks have been standardised, the core network technology has developed. In particular, for packet switched services (that is, as distinct from circuit switched services available in 2G and 3G radio access networks) the general packet radio service (GPRS) core network is used for 2G (GPRS/Enhanced Data rates for Global Evolution (EDGE)) and 3G (universal mobile telecommunications system (UMTS)) radio access networks, while an enhanced packet core (EPC) network is used with 4G (LTE) radio access networks. Work is ongoing to develop a 5G core network for use with new radio (NR) or 5G radio access networks. It is, however, expected that LTE radio access networks will be able to connect to either (or both) EPC and 5G core networks.

There is, therefore, a need to ensure that radio access nodes are able to establish connections for mobile devices with appropriate core network nodes, in light of the various generations of technology (and combinations thereof) which may be deployed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
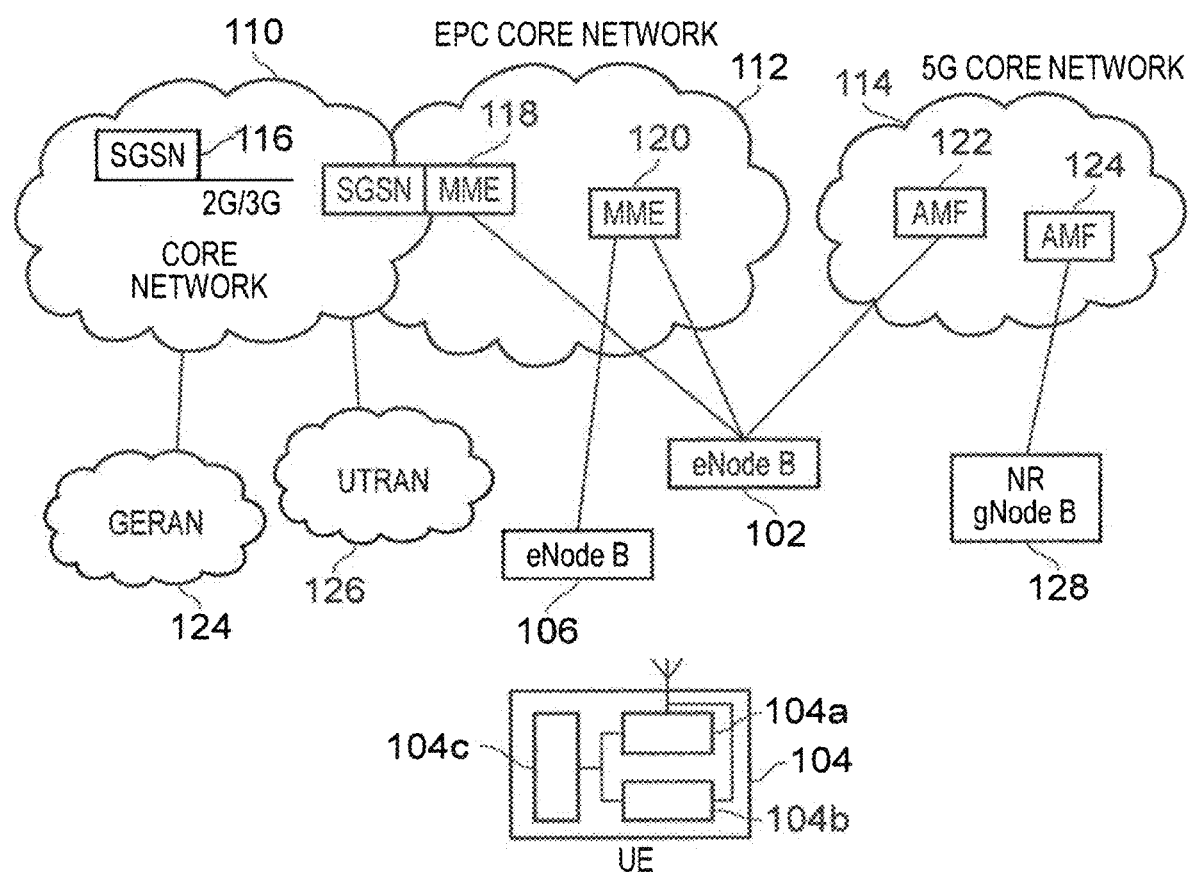
FIG. 1 schematically represents some aspects of a wireless telecommunication network, comprising a plurality of core network types, which may be configured to operate in accordance with certain embodiments of the present disclosure.

FIG. 1 illustrates a network architecture which may be configured in accordance with one or more of the present techniques.

Wireless communications network 100 comprises a number of core networks and radio access networks. As described above, the radio access networks typically provide connectivity in a local area by means of an appropriate wireless interface, operating in accordance with the relevant specifications.

A 2G/3G core network 110 provides GPRS core network services, and comprises one or more entities, such as the serving gateway support node (SGSN) 116.

The 2G/3G core network 110 is connected to a 2G global system for mobile communications (GSM)/EDGE radio access network (GERAN) 124 (consisting of one or more base station subsystems, not shown) and a 3G UMTS terrestrial radio access network (UTRAN) 126 (consisting of one or more radio network controllers and one or more node Bs, not shown).

An EPC network 112 comprises entities such as the mobility management entity (MME) 120. The EPC network 112 is connected to an LTE radio access network, which comprises one or more eNodeBs, such as eNodeBs 102 and 106.

In accordance with proposed specifications, a new core network may be associated with a new radio (NR) access network, which may comprise one or more gNodeBs, such as the NR gNodeB 128. The new core network may be a 5G core network such as the 5G core network 114 and may comprise one or more Access and Mobility Management Function (AMFs), such as the AMFs 122, 124.

Mobile devices, such as the mobile device 104 (which may also be referred to as a mobile terminal, user equipment or mobile station), may be compliant with the radio access specifications required for operation with one or more of the GERAN 124, UTRAN 126, LTE eNodeBs 102, 106 and NR gNodeB 128 and with one or more of the protocols required for interoperability with the corresponding core networks such as the 2G/3G core network 110, the EPC network 112, and the 5G core network 114.

The mobile device 104 comprises transmitter circuitry 104a for transmission of wireless signals, receiver circuitry 104b for the reception of wireless signals and processor circuitry 104c (which may also be referred to as a processor/processor unit) configured to control the terminal device 104. The processor circuitry 104c may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 104c may comprise circuitry which is suitably configured/programmed to provide the desired functionality described herein using conventional programming/configuration techniques for equipment in wireless communications networks. The transmitter circuitry 104a, receiver circuitry 104b and the processor circuitry 104c are schematically shown in FIG. 1 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 104 will in general comprise various other elements associated with its operating functionality, for example a power source, user interface, and so forth, but these are not shown in FIG. 1 in the interests of simplicity.

Interconnections between the core networks, not shown, may facilitate mobility by the mobile device 104 between the various radio access networks.

Some core network entities may perform the functionality associated with entities of two or more different core networks. For example, the 'combo' SGSN/MME entity 118 may perform SGSN functionality and MME functionality in a collocated entity. The use of such entities may lead to cost efficiencies and flexibility, as hardware may be dynamically repurposed according to loading requirements for the respective functionalities.

While in general a given radio access network is served by a corresponding type of core network, developments in the specification of 5G and new radio (NR) architectures may permit deployment scenarios which have not been possible in the development of previous generations of wireless communications technologies.

Specifically, the architecture for 5G core networks may permit an LTE eNodeB, such as the eNodeB 102, to be connected to either or both of an EPC network (such as the EPC network 112) and a 5G core network (such as the 5G core network 114). In other words, the LTE eNodeB 102 may be connected to both the MME 120 and to the AMF 122. In some scenarios (not shown) it may be that an LTE eNodeB may be connected only to a 5G core network (and not to an EPC network). Other LTE eNodeBs, such as the eNodeB 106 in FIG. 1, may be connected only to an EPC network (such as the EPC network 112).

The architecture may, moreover, permit heterogeneous configurations within a given wireless communications network. For example, as shown in FIG. 1, the wireless communications network 100 includes the eNodeB 106 which is connected only to the EPC network 112, and the eNodeB 102, connected to both the EPC network 112 and the 5G core network 114.

This reflects the expectation that it may be beneficial to offer the combination of services and operational modes made available by a 5G core network (for example, in order to take advantage of network function virtualisation (NFV), software defined networking (SDN), quality-of-service (QoS) flow based design, etc.) to mobile devices which are served by an LTE radio access network.

In addition, the possible heterogeneous deployment modes provide more flexibility in deploying 5G core networks and new radio (NR) radio access networks. For example, a combination of 5G core network and NR radio access network may be deployed in hotspots (e.g. localised regions where demand is high) which are also covered by an LTE RAN connected to an EPC network. A mobile device which initially obtains service via the NR RAN and 5G core network, and which subsequently moves outside of the 'hotspot' area, may need to obtain connectivity via an eNodeB which is connected only to an EPC network. Furthermore, such an eNodeB may not have been upgraded to be aware of 5G core network-related functionality (including 5G core network-issued identifiers). The inventors have recognised that it would be beneficial to avoid a need to upgrade such eNodeBs to be compliant with specifications relating to 5G; this would save mobile network operators capital expenditure in respect of these eNodeBs.

Each of the core networks is expected to provide wider connectivity, for example, by means of interconnections with other wired and wireless communications networks, including the internet and public telephony network (not shown in FIG. 1).

Although not shown in FIG. 1, the wireless communications network 100 may include additional core network functionality, for example, a circuit-switched core network providing connectivity to the public switched telephony network (PSTN) for telephony services.

Figure 2:
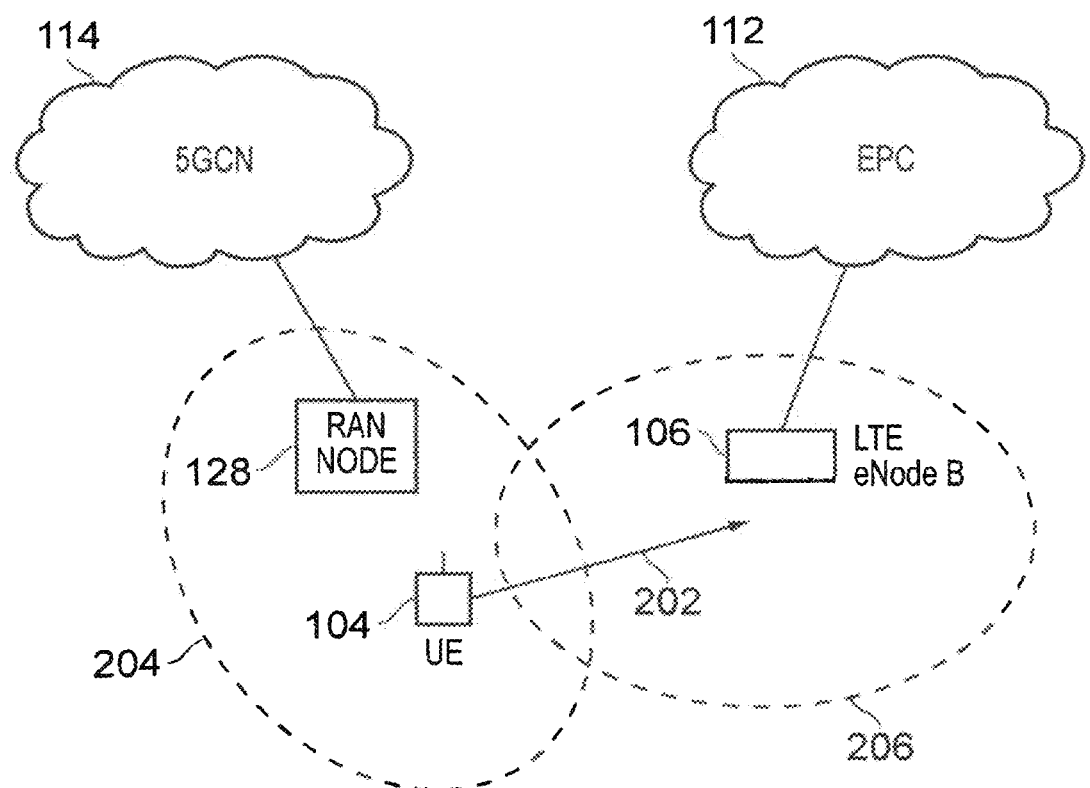
FIG. 2 schematically represents some aspects of a wireless telecommunication network, comprising a plurality of core network types, which may be configured to operate in accordance with certain embodiments of the present disclosure.

FIG. 2 illustrates a mobility scenario for the mobile device 104 in accordance with embodiments of the present technique.

In the process illustrated in FIG. 2, the mobile device 104 is initially within a cell or coverage region 204 associated with a radio access node, which may be the gNodeB 128. The mobile device 104 is obtaining service via the combination of the gNodeB 128 and the 5G core network 114 to which the gNodeB 128 is connected.

Examples of services which may be obtained by a mobile device via a core network include, but are not limited to, packet data transmission and reception (including internet protocol (IP)-based data transmission and reception), location services, messaging services, telephony (voice and/or video), broadcast data reception, supplementary services, mission critical communication, and device-to-device discovery and configuration.

A device may be considered to be 'obtaining service' if it has established connectivity with the core network and is in a state wherein immediate data transmission or reception is possible. For example, a mobile device may be said to be 'obtaining' an IP data transmission and reception service if it and the core network are configured to permit mobile-terminated and/or mobile-originated data transmission immediately. This may require, for example, the completion of any necessary security, access control, billing and charging procedures and the assignment of an IP address.

In any case, initially in FIG. 2 the mobile device 104 has been assigned an identifier by the 5G core network 114. Although final details of the identifiers for use in an NR radio access network and identifiers assigned by a 5G core network are not yet finalised, it is anticipated that the 5G core network 114 will assign to the mobile device 104 a temporary identity which nevertheless is globally unique.

This identity may be referred to as a 5G globally unique temporary identity (5G-GUTI). In order to ensure that the identity is globally unique, it is expected to be constructed in a hierarchical manner, comprising:

a public land mobile network (PLMN) identity, comprising a mobile country code (MCC) and a mobile network code (MNC);

an AMF identity unique within the PLMN, comprising an AMF region ID, an AMF set ID, and an AMF pointer a temporary identity unique within the context of a given AMF (5G temporary mobile subscriber identity, 5G-TMSI).

In other words, the identity is expected to be constructed based on a combination of a unique identifier of the mobile communications network, an identifier of a core network node which is unique within the mobile communications network, and a mobile device-specific identifier, which is unique amongst mobile devices which have been assigned identifiers by the core network node.

This assignment to the mobile device 104 of an identity by the 5G core network 114 is described in more detail below (see for example step S100 described in the context of FIG. 3 and FIG. 4).

As the mobile device 204 moves along the path indicated by the arrow 202, it moves towards a location where service is no longer available from the gNodeB 128, but, being within the coverage region 206 of the LTE eNodeB 106, service is available from the LTE eNodeB 106. Many mechanisms are defined by which a mobile device may change its serving radio access node, for example: network-controlled handover, network-controlled cell change order, and mobile device-controlled cell reselection. The techniques described herein are not limited to any particular mechanism.

As the mobile device 104 moves along the path 202, therefore, at some point it determines that the LTE eNodeB 106 is to be its serving radio access node.

As described above, it is anticipated that an LTE eNodeB may be connected to either or both of a 5G core network and an EPC network. In the example shown in FIG. 2, the LTE eNodeB 106 is connected only to the EPC network 112.

Figure 3:
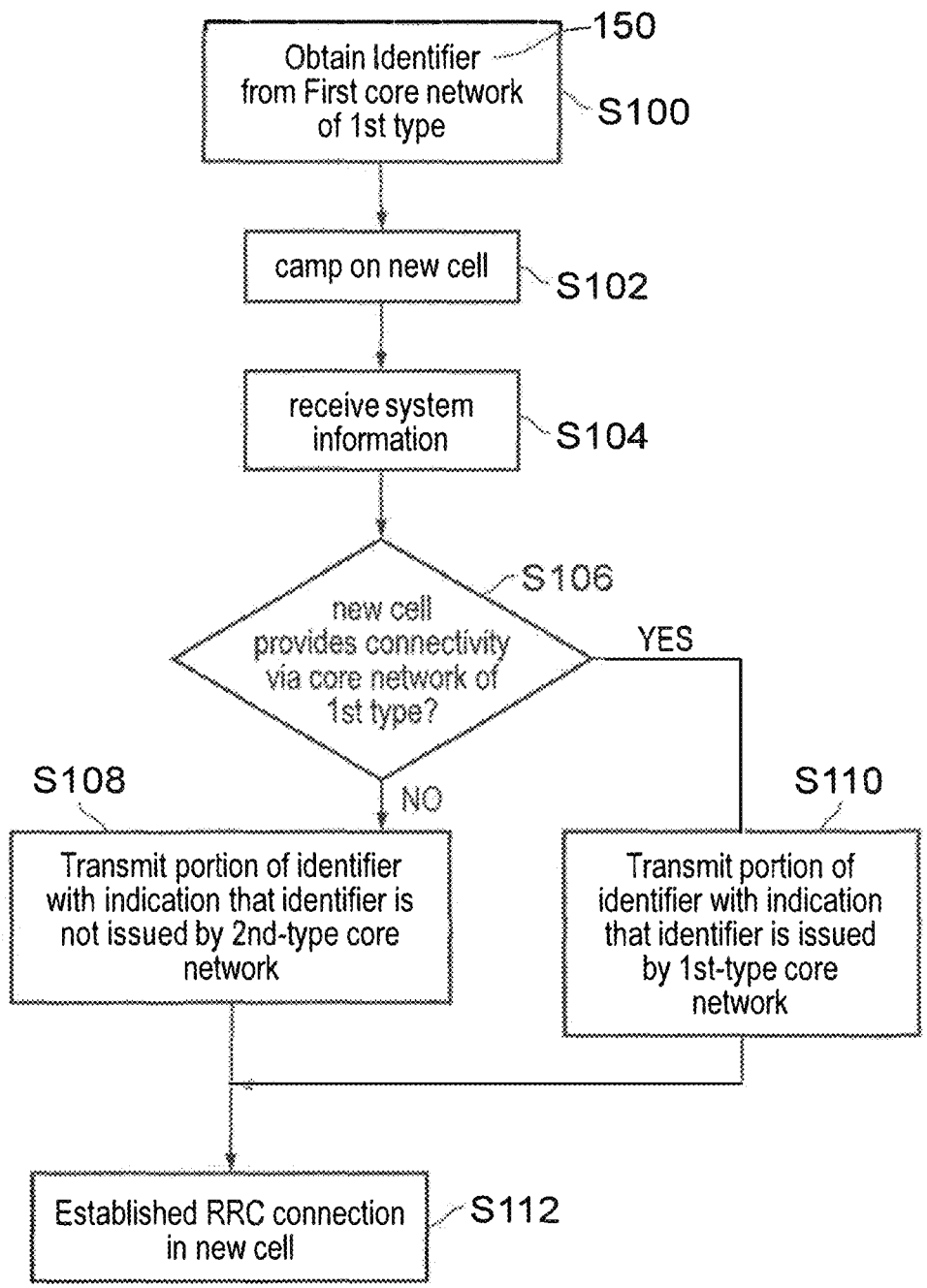
FIG. 3 schematically represents a process flow which may be carried out by a mobile device in accordance with certain embodiments of the present disclosure.

FIG. 3 illustrates an embodiment of the present technique. At the start of the process, the mobile device 104 is being served in a first cell, via a core network of a first type. For example, it may be served by a 5G core network via a NR radio access node. In step S100, the mobile device 104 obtains an identifier 150 from a core network of a first type.

For example, the mobile device 104 may obtain the identifier 150 from the 5G core network 114. The identifier 150 may comprise a mobile country code (MCC), a mobile network code (MNC), an AMF Region ID, an AMF Set ID and an AMF pointer. The identifier 150 may identify one or a group of core network nodes within the 5G core network 114.

In step S102, the mobile device determines that it should select a new cell. This determination may be based on conventional cell reselection techniques whereby the mobile device autonomously determines that a different cell from the one on which it is currently camped is more appropriate. Alternatively, the determination may be in response to a transmission from the radio access network, or by any other means. The determination may be based on an assessment of the respective radio channels between the device and a serving radio access node and between the device and the radio access node associated with the new cell. The mobile device may be in an idle state when this determination is made.

In some embodiments, the selection of the second cell may be made without regards to the type or types of core network via which service may be obtained. In other words, the mobile device 104 may select the second cell without knowledge of which type of core network is connected to a cell controller associated with the second cell.

The new cell may be an LTE cell controlled by an eNodeB, such as the LTE cell 206 controlled by the LTE eNodeB 106.

The mobile device then initiates procedures to obtain service in the new cell in step S102. At step S104, the mobile device receives and decodes signals comprising system information which are broadcast in the new cell. In some embodiments, the system information is transmitted as broadcast signals. In some embodiments, the system information is received in dedicated signalling, i.e. in transmissions which are unicast and intended solely for the mobile device 104.

As a result of processing these signals, the mobile device 104 determines at step S106 whether or not it is possible to obtain service in the new cell via a core network of the same first type as the core network from which it received the identifier 150 in step S100.

In the embodiment illustrated in FIG. 3, the determination at step S106 is based on system information signals received in step S104, as described above. However, the present techniques are not so limited and the mobile device 104 may make the assessment in step S106 based on one or more of received system information, other received signalling, and pre-configured settings.

As described above, historically, each generation of radio access network technology has been associated with a single type of core network. However, it is anticipated that a 4G/LTE radio access network may be connected to either, or both of, an EPC network and a 5G core network. Therefore, while it has been trivial in the past for a mobile device to determine the nature of the core network services which can be obtained from a given radio access network, this is no longer the case.

The inventors of the present technique have recognised that this creates a problem due to the various deployment scenarios which could arise, and the differing capabilities of entities within a network, notwithstanding the fact that they comply with the minimum set of requirements applicable to their type. For example, an LTE-capable eNodeB may comply solely with the 3rd Generation Partnership Project (3GPP) Release 8 specifications for LTE. Alternatively, an LTE-capable eNodeB may also comply with later releases of the specifications, which may provide for, for example, simultaneous connection of an eNodeB with a 5G core network and an EPC network as described above.

As such, according to the present technique, the mobile device 104 may determine, based on, for example, broadcast information such as system information received from an LTE eNodeB controlling the new cell, whether service via a 5G core network is available in the cell. The mobile device 104 may further determine, based on the system information or by any other means, whether service via an EPC network is available in the cell.

As described in [4] the type of core network(s) to which an LTE eNodeB is connected, and thus via which a mobile device may obtain service, can be derived by the mobile device based on either the presence or absence of 5G core network non-access stratum (NAS) information in the system information broadcast by the eNodeB, or by an explicit indication which may be broadcast in system information blocks (SIB), such as SIB1 or SIB2, or in the master information block (MIB).

In some embodiments, the mobile device 104 may additionally determine that service via a second type of core network is available from the new cell. For example, the mobile device may determine that the LTE eNodeB 106 is connected to the EPC core network 112 and therefore that EPC service is available in the new cell 206.

If the outcome of the determination at step S106 is that service via a core network of the first type is not available in the cell, the control passes to step S108.

In step S108, the mobile device transmits as part of a connection establishment procedure, at least a portion of the identifier 150 received in step S100 to the controller of the new cell, together with an indication that the identifier 150 was not issued by a network of the second type. During the connection establishment procedure, the mobile device 104 does not identify the type (i.e. the first type) of core network from which the identifier 150 was obtained.

One or more portions of the identifier 150 may be mapped into a message field designated for identifiers issued by the second type of core network. In some embodiments, the portion of the identifier 150 comprises the entirety of the identifier 150.

As such, for example, a mobile device 104 having obtained a 5G core network-issued identifier 150 as described above, and determining that service via a 5G core network is not available, may nevertheless transmit a portion of the 5G-issued identifier 150 within a message field designated for an EPC identifier, such as a globally unique mobility management entity (MME) identity (GUMMEI), and may further refrain from indicating that the 5G-issued identifier 150 was obtained from, in fact, a 5G core network. The mobile device 104 may instead indicate that the identifier 150 was not obtained from an EPC network.

An example of a possible mapping of portions of a 5G-issued identifier to respective portions of an EPC-issued identifier is shown in Table 1 below (adapted from sub-clause 2.10.2.1.2 of 3GPP 23.003 v15.2.0 [1]):

TABLE 1

| Mapping from 5G to EPC identifiers | |
|---|---|
| 5G core network-issued identifier part | EPC network-issued identifier part |
| MCC | MCC |
| MNC | MNC |
| AMF Region ID | MME Group ID |
| AMF Set ID & AMF Pointer | MME Code (bits 7-4 and bits 3-0, respectively) |
| 5G-TMSI | M-TMSI |

The inventors have recognised the possibility that an LTE-compliant eNodeB may not be configured to recognise 5G-issued identifiers and therefore may not be configured to correctly process an identifier which is identified as such. For such an eNodeB, it may be sufficient to be notified that the identifier is or is not an EPC-issued identifier, as the case may be (since an eNodeB which is not configured with 5G-related capabilities may, in any case, be required to be operable with an EPC network).

The indication that the identifier is not an EPC-issued identifier may be by means of an indication that the identifier is a 'mapped' identifier or, alternatively, that it is not an EPC 'native' identifier. The indication as to whether the identifier (which may be designated as a GUMMEI) is mapped or native may preferably be by means of signalling compliant with an earlier version of a specification, with which the eNodeB is compliant.

The process in FIG. 3 thereby avoids the transmission of unnecessary information to an eNodeB which may be unable to process it correctly.

If, on the other hand, the outcome of the determination at step S106 is that service via a first-type core network is available in the cell, the control passes to step S110. In step S110, the mobile device transmits, as part of a connection establishment procedure, at least a portion of the identifier 150 received in step S100 to the controller of the new cell, together with an indication that the identifier 150 was issued by a network of the first type.

For example, the mobile device 104, having obtained the 5G core network-issued identifier 150 as described above, and determining that service via a 5G core network is available, transmits all, or at least a portion, of the 5G-issued identifier 150 and may further indicate that the identifier 150 was obtained from a 5G core network. The transmission of the identifier 150 may be in accordance with a mapping, such as that shown in Table 1 above.

In this case, since the eNodeB is identified as being connected to a 5G core network (and thus, '5G-capable'), it is relevant and beneficial to provide both the identifier 150 and an indication that the identifier was obtained from a 5G core network. This may aid the eNodeB in the selection of core network entity with which it establishes a connection, for the mobile device.

Subsequent to steps S108 and S110, the mobile device completes the connection establishment process with the radio access node controlling the new cell in step S112. It may further obtain service via a core network node of a core network via the controlling radio access node (not shown).

Figure 4:
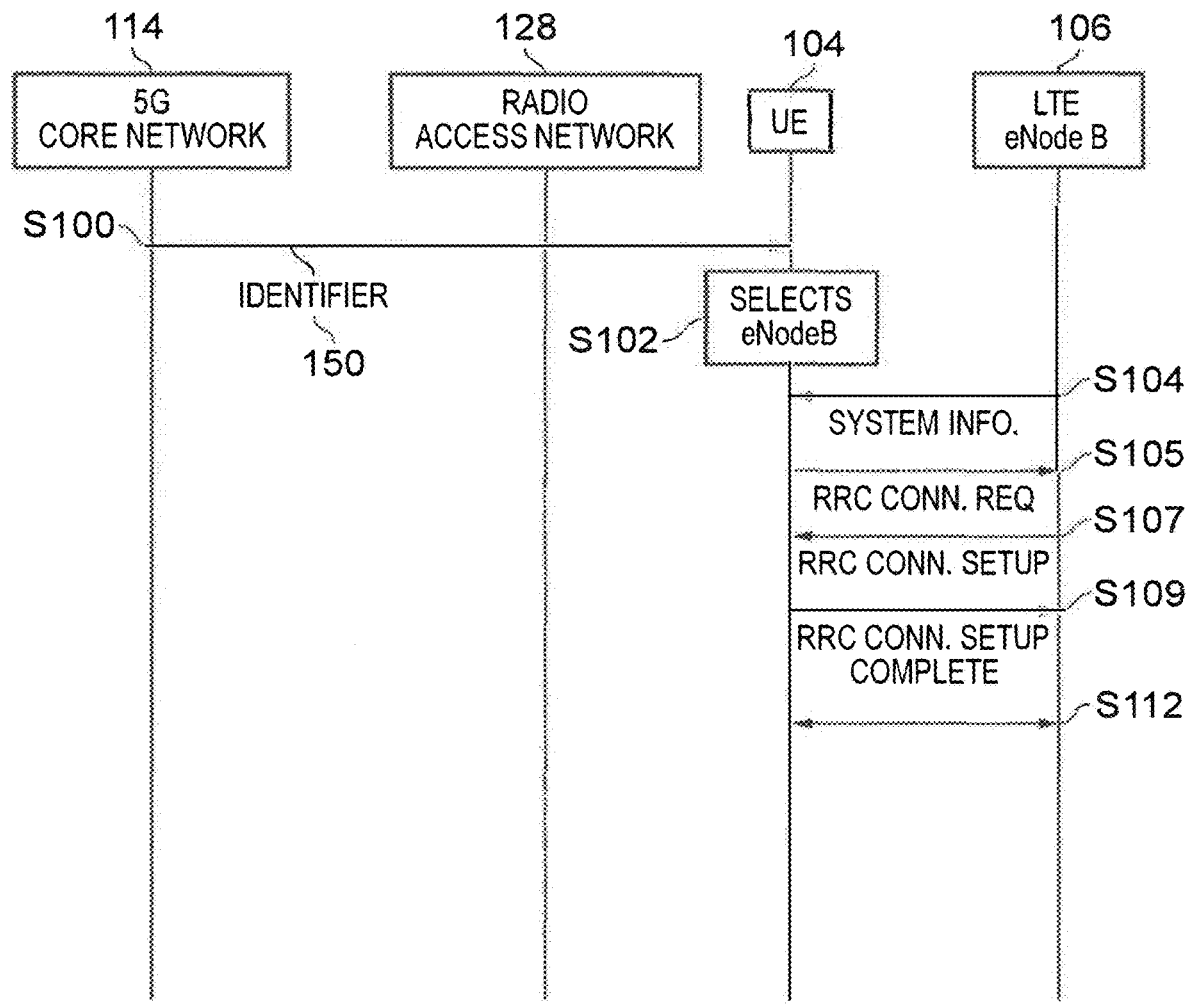
FIG. 4 is a signalling diagram schematically represents a message sequence flow in accordance with certain embodiments of the present disclosure.

Further details of a connection establishment procedure by an LTE-capable mobile device (user equipment, UE) with an LTE radio access network comprising an LTE-capable eNodeB, in accordance with the present technique are illustrated in FIG. 4. Steps S100, S102, S104, S112 correspond to like-numbered steps in FIG. 3 and are described above.

Following the receipt of the system information at step S104, the mobile device 104 may transmit a radio resource control (RRC) Connection Request message at step S105. In response, the eNodeB 106 may transmit an RRC Connection Setup message (step S107). The mobile device 104 may then transmit an RRC Connection Setup Complete message (S109).

Steps S108 and S110 described above in connection with FIG. 3 may occur at any time during the connection establishment sequence illustrated in FIG. 4, but may preferably occur as part of step S109, such that the transmission of the portion of the identity and any indications specified as part of steps S108 and S110 are transmitted within the RRC Connection Setup Complete message.

In some embodiments, step S108 and S110 occur by means of the transmission of an RRC message which substantially complete the establishment or re-establishment of an RRC connection. For example, the RRC message transmitted as part of steps S108 and S110 may be an RRC Connection Setup Complete message, as illustrated in step S109 of FIG. 4, or may be an RRC Connection Resume Complete.

Any other suitable message may be used to convey the identifier 150 and any additional indication as described above from the mobile device 104 to the eNodeB 106. In some embodiments, for example, the identifier 150 may be transmitted in a "MSG5", which the skilled person will appreciate refers to an RRC message transmitted from a mobile device to an eNodeB as part of RRC signalling for the establishment, re-establishment or resumption of an RRC connection.

Step S106 may occur at any time between step S104 and whichever of steps S110 and S110 is applicable.

In some embodiments of the present technique, the portion of the identity transmitted in the new cell comprises the entirety of the identity 150.

In some embodiments of the present technique, the portion of the identity 150 transmitted in the new cell may comprise multiple portions; these portions may be re-arranged, that is, they may be ordered in a different sequence from the sequence in which they are ordered when received in step S100.

In some embodiment of the present technique, the semantics of an existing field 'gummei-Type' of the RRC Connection Setup Complete message may be modified, from the perspective of the mobile device, to indicate whether the GUMMEI included is native (assigned by EPC) or mapped (using 2G/3G/5G identifiers). The inventors have recognised that it is necessary for an eNodeB to be able to determine whether or not the identifier was obtained from an EPC network (i.e. is native), but that it is not essential that, where the identifier was not obtained from an EPC network, the eNodeB is capable of distinguishing between identifiers issued by a 2G/3G (GPRS) core network and by a 5G core network.

An eNodeB receiving an indication that the identifier is 'native' may perform MME selection based on any existing technique, which may include MME load-balancing in accordance with the appropriate specifications or configuration. Such an eNodeB may further select an MME based on an evaluation of one or more identifiers included in a NAS-layer protocol data unit, such as a tracking area identity (TAI) or S-TMSI, and apply any specific action based on a pre-determined or pre-configured mapping.

An eNodeB which is not upgraded to be aware of the possibility of a 5G core network (or its corresponding identifier types) receiving an indication that the identifier is 'mapped', may thus consider that the identifier was issued by a 2G/3G GPRS core network (e.g. by an SGSN). Such an eNodeB may establish a connection with an MME which is known to be co-located with an SGSN, and which may be a 'combo' node providing both MME and SGSN functionality.

In some embodiments of the present technique, the eNodeB may not be aware of whether an identifier which is not an EPC identifier (such as the identifier 150) was issued by a 5G core network or by a 2G/3G core network. In some such circumstances, the eNodeB may behave as if the identifier was issued by a 2G/3G core network. In such circumstances, an MME may receive a connection establishment request in respect of a device which is identified by a 'mapped' identifier, without any indication as to whether the identifier was issued by a 2G/3G GPRS core network entity or by a 5G core network entity. In some embodiments, an MME may contact both a GPRS (2G/3G) core network entity and a 5G core network entity in order to attempt to resolve the confusion. As such, the MME may take appropriate steps to determine which core network issued the identifier, as described below.

This may mitigate the possibility that a mapped version of a valid 2G/3G core network identifier and a mapped version of a valid 5G identifier are identical and yet relate to different mobile devices.

Figure 5:
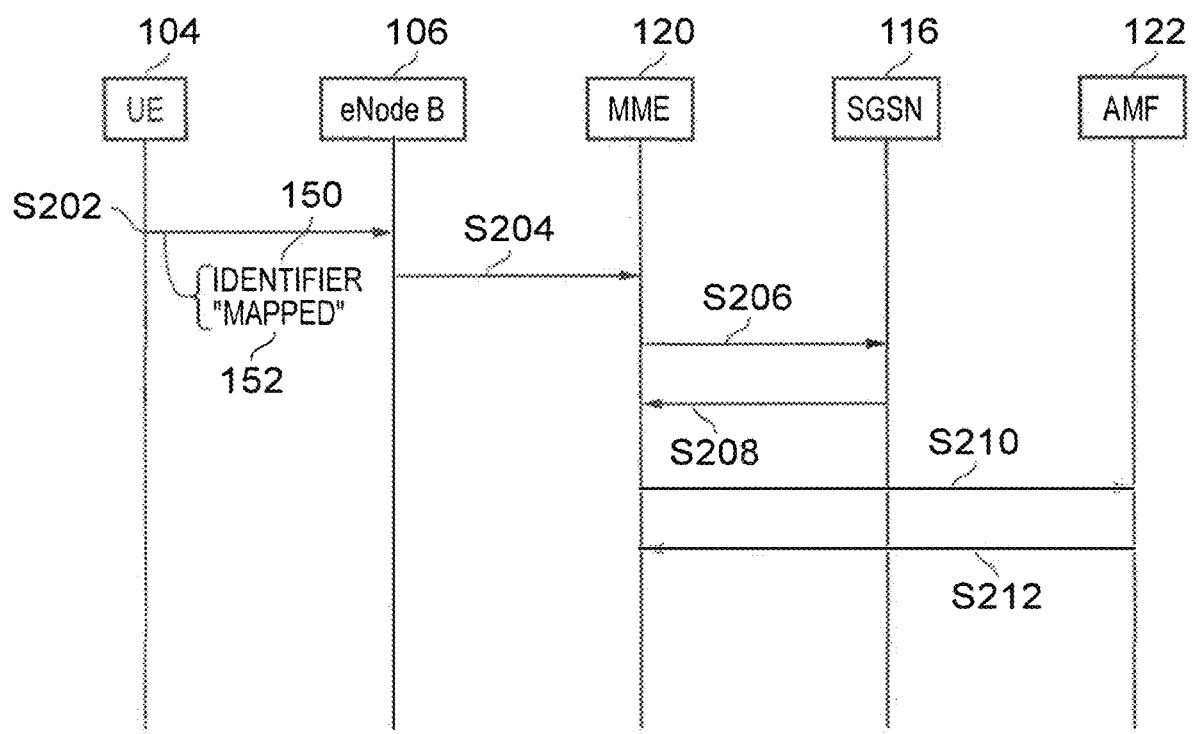
FIG. 5 is a signalling diagram schematically represents a message sequence flow in accordance with certain embodiments of the present disclosure.

FIG. 5 illustrates a message sequence flow in accordance with the present technique.

The process starts at step S202, in which the mobile device 104 transmits a message to the eNodeB 106, the message including the core network-issued identifier 150 and an indication 152 that the identifier 150 was not issued by an EPC network. The indication may be by means of the 'mapped' indication described above.

Step S202 may thus, for example, be substantially the same as step S108 described above in the context of FIG. 3.

In order to obtain the necessary radio access network context for the mobile device 104, or for any other reason, the eNodeB 106 forwards the identifier to a selected MME 120. As described above, the MME 120 may then attempt to retrieve context associated with the mobile device 104 from one or more entities associated with different types of core network. For example, the MME 120 may first transmit a request to the SGSN 116, the request comprising at least the identifier 150. In response, the SGSN 116 may transmit an indication indicating whether the identifier corresponds to an identifier issued by the 2G/3G core network of which it forms a part.

The SGSN 116 may determine this according to any appropriate method; for example, the SGSN 116 may be configured with a list of core network node identifiers for all SGSNs within the 2G/3G core network 110. By determining that the core network node identifier contained within the identifier 150 does not match that of any of the SGSNs within the 2G/3G core network 110, it can determine that the identifier 150 was not issued by any entity within the 2G/3G core network 110. Alternatively or additionally, one or more configured rules within the SGSN 116 may enable it to determine whether or not the identifier 150 not issued by any entity within the 2G/3G core network 110, the rules being based on corresponding rules by which device identifiers are assigned within the 2G/3G core network 110. An example rule may be that one or more bits in predetermined positions within the mobile device-specific portion of the identity 150 does (or does not) not match a pattern which is characteristic of all identities issued by entities within the 2G/3G core network 110.

In the example scenario illustrated in FIG. 5, the SGSN 116 determines that the identifier 150 was not issued by an entity within the 2G/3G core network 110, and indicates this in the response message S208.

The MME 120 therefore (or, in some embodiments, simultaneously with step S206) transmits a request S120 to the AMF 122, similar to the request S206. The AMF 122 makes a corresponding determination as to whether the identifier 150 was issued by an entity within the 5G core network 114. The AMF 122 may make use of any appropriate technique, which may be similar to those described above in respect of the SGSN 116, to make the determination.

In response, the AMF 122 transmits an indication S212 of the result of its determination to the MME 120.

Based on the responses S208 and S212, the MME 120 thus determines the nature of the identifier 150 and is able to process the connection request in accordance with appropriate techniques, such as those which form part of existing or proposed specifications for inter-RAT mobility.

In another embodiment of the present technique, the MME 120 is configured with means of determining directly whether the identifier 150 was issued by a 2G/3G core network entity or by a 5G core network entity. This may be by means of pre-configured rules, such as knowledge of the core network node identities corresponding to SGSNs and AMFs in the respective core networks, and/or rules relating to specific bit positions within the identifier 150 and their assignment by the respective core network entities. As an example, the 12th least-significant bit of the S-TMSI or 5G-TMSI may be set to '1' by SGSNs and to '0' by AMFs. Therefore, if the 12th least-significant bit of the S-TMSI or 5G-TMSI portion of the identifier 150 is a '1', the MME 120 is able to determine that the identifier 150 was issued by a 2G/3G core network entity, such as the SGSN 116.

The technique illustrated in FIG. 5 therefore enables an MME to determine whether an identifier, which is not an EPC-issued identifier, was issued by a 2G/3G core network or by a 5G core network. This avoids the need for the determination to be made by the eNodeB, and thus obviates the need for upgrading eNodeBs so that they are capable of such determination.

In some embodiments, if the identifier 150 in step S108 or S110 is associated with the indication 152 that the identifier 150 was not issued by an EPC network, the eNodeB 106 may be configured to transmit the corresponding connection request to an MME which is co-located with a core network entity associated with the (non-EPC) core network which is most likely to have issued the identifier 150. This may take into account geographic network coverage of the respective core networks, mobility statistics, deployment history, or any other relevant information.

For example, where it is expected that in most cases, the network identifier 150, if not issued by the EPC network 112, was issued by the 2G/3G core network 110, then the eNodeB 106 may be configured to route connection requests for 'mapped' identifiers (for example, where the connection request signalling comprised the identifier 150 together with the indication 152) to the MME 118, which provides both MME and SGSN functionality.

Figure 6:
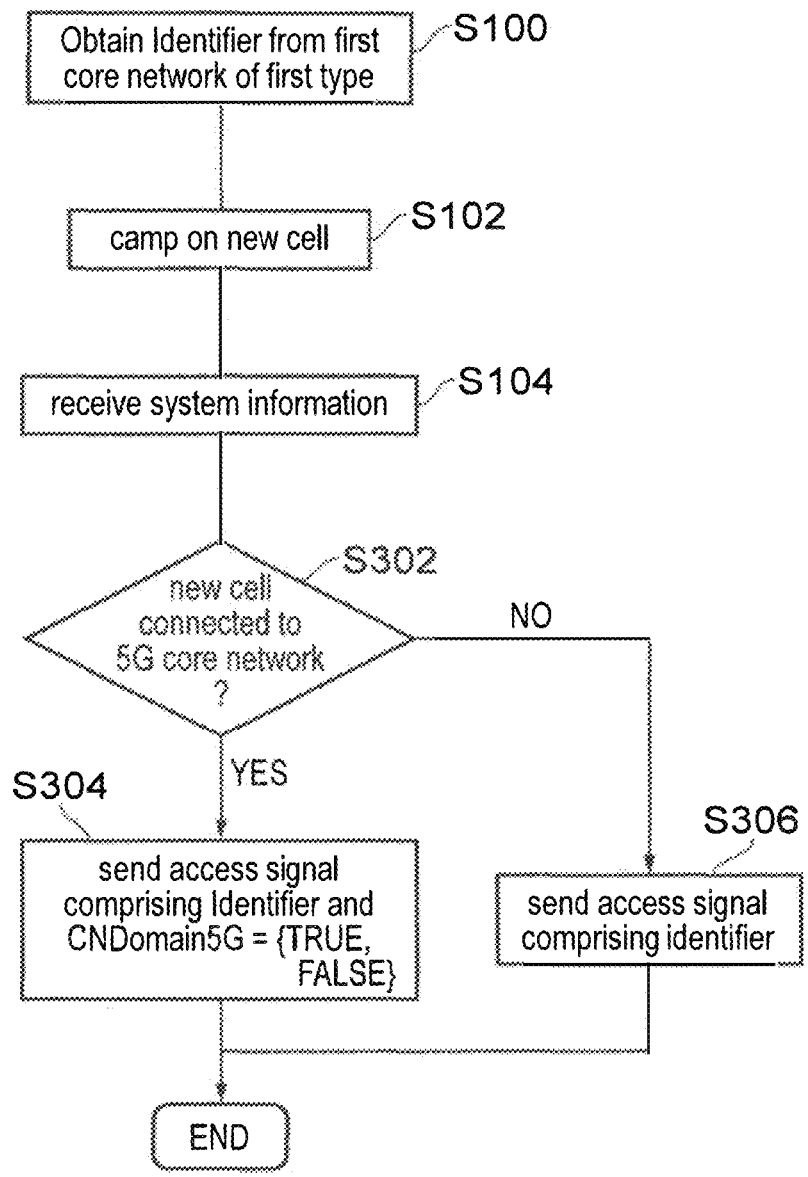
FIG. 6 schematically represents a process flow which may be carried out by a mobile device in accordance with certain embodiments of the present disclosure.

FIG. 6 illustrates a process in accordance with an embodiment of the present technique.

As in FIGS. 3 and 4, the process starts with steps S100, S102, and, in some embodiments, step S104, the descriptions of which are not repeated here. Although shown as receiving the indicator 150 from the 5G core network 114, in some embodiments the identifier 150 may be received from other types of core networks.

After step S104, the mobile device 104 determines in step S302 whether service is available via a core network of the first type in the new cell. As described above in respect of step S106 illustrated in FIG. 3, the determination at step S302 may be based on one or more of received broadcast or unicast system information signalling, other received signalling, and pre-configured settings.

In the example illustrated in FIG. 6, the first type of core network is a 5G core network.

If the mobile device 104 determines that service via a first type (e.g. 5G) core network is available, then control passes to step S304. In this step, the mobile device transmits an access signal including the identifier 150 or a portion thereof. In addition, within the access signal, the mobile device 104 indicates whether or not the identifier S150 was allocated by an entity within a core network of the first type. In some embodiments, this may be a cn-Domain-5G boolean indicator, as described in [2] or similar boolean indicator.

If, at step S302, the mobile device 104 determines that service via the first type (e.g. 5G) core network is not available, then control passes to step S306. In this step, the mobile device transmits the access signal including the identifier 150 or a portion thereof. In this case, the access signal does not include any indication as to whether or not the identifier S150 was allocated by an entity within a core network of the first type.

The access signal may be an RRC message for the purposes of establishing an RRC connection. For example, the access signal may be a RRC Connection Setup Complete message, an RRC Connection Resume Complete message, or a "MSG5". In some embodiments, the access signal may be the RRC Connection Request message illustrated at S105 in FIG. 4.

In the embodiment illustrated in FIG. 6, the process ends after steps S304 and S306, however in some embodiments, the process continues with additional steps in the establishment of a connection via the new cell. These additional steps may be in accordance with one or more of the embodiments described above and illustrated in FIG. 3 and FIG. 4. In particular, some embodiments may include steps S106, S108 and S110 in addition to the steps illustrated in FIG. 6 and described above.

The various embodiments described herein have the benefit of avoiding the need to upgrade all eNodeBs to be able to interpret signalling associated with 5G core networks. In some embodiments, modifications may be made to an MME as described above, however, this may affect fewer entities within a given network.

Although the embodiments impose modified behaviour on the mobile device 104, the skilled person will appreciate that the mobile device 104 may in any case need to be configured accordingly in order to inter-operate with, and obtain services via, a 5G core network. However, this is not the case for an eNodeB which is to be connected only to an EPC network.

However, the techniques describe herein ensure that a mobile device establishing a connection with an eNodeB which is connected to both a 5G core network and an EPC network is able to distinguish between an identifier which was issued by the 5G core network and one issued by an EPC network, and to route messages to the appropriate core network entity accordingly.

These benefits arise because a mobile device performing a connection establishment procedure in a new cell may be configured to identify a type of core network from which a core network identifier was received in a message containing the core network identifier only if the mobile device has determined that service via a particular type of core network is available in the new cell.

Alternatively or additionally, the mobile device performing a connection establishment procedure in the new cell may be configured to indicate whether a core network identifier was received from a particular type of core network in a message containing the core network identifier only if the mobile device has determined that service via the particular type of core network is available in the new cell.

Respective features of the present disclosure are defined by the following numbered paragraphs:

Paragraph 1. A method of establishing a connection via a core network by a mobile terminal, the method comprising:
  receiving by the mobile terminal in a first cell an identifier assigned by a node in a first core network of a first type, the identifier comprising an identifier of the node or a group of nodes in the first core network,
  selecting a second cell, the second cell permitting service via a core network of a second type,
  determining whether service via a core network of the first type is available from the second cell,
  establishing a connection via the second cell by transmitting a message including a first indication, the first indication based on at least a portion of the identifier, and
  when service via a core network of the first type is not available from the second cell, transmitting in the message a second indication, the second indication indicating that the identifier was received from a core network different from the second type.

Paragraph 2. A method according to Paragraph 1 wherein the second indication indicates that the identifier was received from one of a 5G core network and a general packet radio service, GPRS, core network.

Paragraph 3. A method according to Paragraph 1 or Paragraph 2, the method comprising:
  when service via a core network of the first type is available from the second cell, transmitting in the message an indication that the identifier was received from a core network of the first type.

Paragraph 4. A method according to any of Paragraphs 1 to 3, wherein the first type of core network is a 5G core network.

Paragraph 5. A method according to any of Paragraphs 1 to 4, wherein the second type of core network is an enhanced packet core, EPC, network Paragraph 6. A method according to any of Paragraphs 1 to 5, wherein establishing the connection via the second cell comprises transmitting a radio resource control, RRC, message including the first indication and the second indication.

Paragraph 7. A method according to any of Paragraphs 1 to 6, wherein the first indication is transmitted in a message element designated for the transmission of an identifier of a network node in a core network of the second type.

Paragraph 8. A method according to any of Paragraphs 1 to 7, wherein the service available to the mobile terminal is a service supporting packet data communications for transmitting data from the mobile terminal or receiving data at the mobile terminal.

Paragraph 9. A method according to any of Paragraphs 1 to 8, the method comprising
  receiving a broadcast transmission in the second cell, and wherein the determining whether service via a core network of the first type is available from the second cell is based on the broadcast transmission.

Paragraph 10. A method according to Paragraph 1 to 9, wherein the step of transmitting in the message a second indication, the second indication indicating that the identifier was received from a core network different from the second type, is performed without identifying the first type of core network.

Paragraph 11. A method of establishing a connection via a core network by a mobile terminal, the method comprising:
  receiving in a first cell an identifier assigned by a node in a first core network, the identifier comprising an identifier of a node or group of nodes in the first core network,
  selecting a second cell,
  determining whether service via a core network of the first type is available from the second cell,
  establishing a connection via the second cell by transmitting an access signal based on at least a portion of the identifier,
  when service via a core network of the first type is available from the second cell, transmitting with the access signal a first indication, the first indication indicating whether or not the identifier was received from a core network of the first type, and when service via a core network of the first type is not available from the second cell, refraining from transmitting the second indication in the message.

Paragraph 12. A method according to Paragraph 1, wherein the first type of core network is a 5G core network Paragraph 13. A method according to Paragraph 11 or Paragraph 12, wherein the access signal is a radio resource control, RRC, message and the base station is a Long Term Evolution, LTE, eNodeB.

Paragraph 14. A method according to any of Paragraphs 11 to 13, wherein the service available to the mobile terminal is a service supporting packet data communications for transmitting data from the mobile terminal or receiving data at the mobile terminal.

Paragraph 15. A method according to any of Paragraphs 11 to 14, the method comprising receiving a broadcast transmission in the second cell, and wherein the determining whether service via the core network of the first type is available from the second cell is based on the broadcast transmission.

Paragraph 16. A method of establishing a connection via a core network by a mobile terminal, the method comprising:

receiving in a first cell an identifier assigned by a node in a first core network, the identifier comprising an identifier of a node or group of nodes in the first core network, selecting a second cell, the second cell permitting service via a core network of a second type, determining whether service via a core network of the first type is available from the second cell, transmitting an access signal in the second cell based on at least a portion of the identifier, when service via a core network of the first type is available from the second cell, transmitting with the access signal a first indication, the first indication indicating whether or not the identifier was received from a core network of the first type, when service via a core network of the first type is not available from the second cell, refraining from transmitting the first indication, transmitting a message including a second indication, the second indication based on at least a second portion of the identifier, and when service via a core network of the first type is not available from the second cell transmitting in the message a third indication, the third indication indicating that the identifier was received from a core network different from the second type, without identifying the first type of core network.

Paragraph 17. A mobile terminal for use in a wireless communication system, the wireless communications system comprising a first core network of a first type and a second core network of a second type, the mobile terminal comprising controller circuitry, transmitter circuitry and receiver circuitry configured to operate together such that the terminal device is operable:

to receive by the mobile terminal in a first cell an identifier assigned by a node in the first core network of a first type, the identifier comprising an identifier of the node or a group of nodes in the first core network, to select a second cell, the second cell permitting service via the second core network of the second type, to determine whether service via a core network of the first type is available from the second cell, to establish a connection via the second cell by transmitting a message including a first indication, the first indication based on at least a portion of the identifier, and when service via a core network of the first type is not available from the second cell, to transmit in the message a second indication, the second indication indicating that the identifier was received from a core network different from the second type.

Paragraph 18. A mobile terminal for use in a wireless communication system, the wireless communications system comprising a first core network of a first type and a second core network of a second type, the mobile terminal comprising controller circuitry, transmitter circuitry and receiver circuitry configured to operate together such that the terminal device is operable:

to receive in a first cell an identifier assigned by a node in the first core network, the identifier comprising an identifier of a node or group of nodes in the first core network, to select a second cell, to determine whether service via a core network of the first type is available from the second cell, to establish a connection via the second cell by transmitting an access signal based on at least a portion of the identifier, when service via a core network of the first type is available from the second cell, to transmit with the access signal a first indication, the first indication indicating whether or not the identifier was received from a core network of the first type, and when service via a core network of the first type is not available from the second cell, to refrain from transmitting the second indication in the message.

Paragraph 19. Circuitry for a mobile terminal for use in a wireless communication system, the wireless communications system comprising a first core network of a first type and a second core network of a second type, the circuitry comprising controller circuitry, transmitter circuitry and receiver circuitry configured to operate together such that the circuitry is operable:

to receive in a first cell an identifier assigned by a node in the first core network of a first type, the identifier comprising an identifier of the node or a group of nodes in the first core network, to select a second cell, the second cell permitting service via the second core network of the second type, to determine whether service via a core network of the first type is available from the second cell, to establish a connection via the second cell by transmitting a message including a first indication, the first indication based on at least a portion of the identifier, and when service via a core network of the first type is not available from the second cell, to transmit in the message a second indication, the second indication indicating that the identifier was received from a core network different from the second type.

Paragraph 20. Circuitry for a mobile terminal for use in a wireless communication system, the wireless communications system comprising a first core network of a first type and a second core network of a second type, the circuitry comprising controller circuitry, transmitter circuitry and receiver circuitry configured to operate together such that the circuitry is operable:

to receive in a first cell an identifier assigned by a node in the first core network, the identifier comprising an identifier of a node or group of nodes in the first core network, to select a second cell, to determine whether service via a core network of the first type is available from the second cell, to establish a connection via the second cell by transmitting an access signal based on at least a portion of the identifier, when service via a core network of the first type is available from the second cell, to transmit with the access signal a first indication, the first indication indicating whether or not the identifier was received from a core network of the first type, and when service via a core network of the first type is not available from the second cell, to refrain from transmitting the second indication in the message.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 23.003 V15.2.0 (2017-12)
[2] R2-1713272, "Handling of Collision between UE Identifiers in LTE connected to 5GC", Ericsson, 3GPP TSG-RAN WG2 #100, Reno, Nev., USA, 27 November 1December 2017
[3] R2-110290, "Discussion document on explicit AS signalling for mapped PTMSI/GUTI", Alcatel-Lucent, 3GPP TSG-RAN WG2 #72bis, Dublin, Ireland, Jan. 17-21, 2011
[4] 3GPP Specification 36.300, "Evolved Universal Terrestrial Radio Access (E-UTRA) and Evolved Universal Terrestrial Radio Access Network (E-UTRAN); Overall description; Stage 2," 3rd Generation Partnership Project.

What is claimed is:

1. A terminal device for use in a wireless communication system, the wireless communications system comprising a first type of core network and a second type of core network, the terminal device comprising:
    circuitry configured to
        receive, in a first cell, an identifier assigned by a node in the first type of core network, the identifier comprising a first identifier of the node or a group of nodes in the first type of core network;
        select a second cell;
        determine whether service via the first type of core network is available from the second cell;
        establish a connection via the second cell by transmitting a message based on at least a portion of the identifier;
        in a case that service via the first type of core network is available from the second cell, to transmit a first indication in the message indicating whether the identifier was received from the first type of core network; and
        in a case that service via the first type of core network is not available from the second cell, to transmit a second indication in the message indicating that a second identifier for the second type of core network is mapped from the identifier.

2. The terminal device of claim 1, wherein
the first type of core network is a 5G core network.

3. The terminal device of claim 1, wherein
the first type of core network is a 5G core network, and the second type of core network is an enhanced packet core (EPC) network.

4. The terminal device of claim 3, wherein
the identifier is a 5G globally unique temporary identity (5G GUTI).

5. The terminal device of claim 4, wherein
the identifier comprises an Access and Mobility Management Function (AMF) region ID, an AMF set ID, and an AMF pointer.

6. The terminal device of claim 5, wherein
the message is a radio resource control (RRC) Connection Setup Complete message.

7. The terminal device of claim 6, wherein
the second identifier is a globally unique mobility management entity (MME) identity (GUMMEI).

8. The terminal device of claim 7, wherein
the AMF region ID is mapped to an MME group ID.

9. The terminal device of claim 8, wherein
the AMF set ID and the AMF pointer are mapped to an MME Code.

10. The terminal device of claim 9, wherein
the second indication is transmitted in a GUMMEI-Type field in the RRC Connection Setup Complete message.

11. A node for a first type of core network in a wireless communication system, the wireless communications system comprising the first type of core network, a second type of core network and terminal devices, the node comprising:
    circuitry configured to
        transmit, in a first cell, an identifier to the terminal devices, the identifier comprising a first identifier of the node or a group of nodes in the first type of core network;
        transmit system information indicating whether service via the first type of core network is available in the first cell;
        establish a connection via the first cell with a first terminal device by receiving a message based on at least a portion of the identifier; and
        receive from the first terminal device a first indication in the message indicating whether the identifier was received from the first type of core network, wherein
    the identifier is a 5G globally unique temporary identity (5G GUTI), and
    the identifier comprises an Access and Mobility Management Function (AMF) region ID, an AMF set ID, and an AMF pointer.

12. The node of claim 11, wherein
the first type of core network is a 5G core network, and the second type of core network is an enhanced packet core (EPC) network.

13. The terminal device of claim 11, wherein
the message is a radio resource control (RRC) Connection Setup Complete message.

14. A node for a second type of core network in a wireless communication system, the wireless communications system comprising the first type of core network, the second type of core network and terminal devices, the node comprising:
    circuitry configured to
        transmit system information in a second cell indicating whether service via the first type core network is available in the second cell;

establish a connection via the second cell with a first terminal device by receiving a message based on at least a portion of an identifier assigned by another node in the first type of core network; and receive from the first terminal device a second indication in the message indicating that the second identifier is mapped from the identifier assigned by the another node in the first type of core network, the identifier assigned by the another node comprising a first identifier of the node or a group of nodes in the first type core network.

15. The node of claim 14, wherein
the first type of core network is a 5G core network, and
the second type of core network is an enhanced packet core (EPC) network.

16. The node of claim 15, wherein
the identifier is a 5G globally unique temporary identity (5G GUTI), and comprises an Access and Mobility Management Function (AMF) region ID, an AMF set ID, and an AMF pointer.

17. The node of claim 16, wherein
the message is a radio resource control (RRC) Connection Setup Complete message.

18. The node of claim 17, wherein
the second identifier is a globally unique mobility management entity (MME) identity (GUMMEI),
the AMF region ID is mapped to an MME group ID,
the AMF set ID and the AMF pointer are mapped to an MME Code, and
the second indication is transmitted in a GUMMEI-Type field in the RRC Connection Setup Complete message.

* * * * *